US005676446A

United States Patent [19]

Gold

[11] Patent Number: 5,676,446
[45] Date of Patent: Oct. 14, 1997

[54] LIGHT CUBE MODULE

[75] Inventor: Ronald S. Gold, Fullerton, Calif.

[73] Assignee: Hughes Aircraft Company, Los Angeles, Calif.

[21] Appl. No.: 699,685

[22] Filed: Aug. 14, 1996

Related U.S. Application Data

[63] Continuation of Ser. No. 395,276, Feb. 27, 1995, abandoned, which is a continuation of Ser. No. 159,417, Nov. 29, 1993, abandoned.

[51] Int. Cl.$^6$ .................................................. F21V 8/00
[52] U.S. Cl. ............................. 362/32; 362/80; 362/263; 362/373; 362/294; 385/115
[58] Field of Search ........................ 362/32, 262, 255, 362/261, 263, 264, 373, 294, 345, 80; 385/115, 147, 901, 31

[56] References Cited

U.S. PATENT DOCUMENTS

| | | | |
|---|---|---|---|
| 2,117,099 | 5/1938 | Maly | 362/32 |
| 2,434,774 | 1/1948 | Sigman | 362/2.94 X |
| 2,519,690 | 9/1950 | Recktenwald | 362/32 |
| 3,018,362 | 1/1962 | Joyce | 362/32 |
| 3,455,622 | 7/1969 | Cooper | 362/32 X |
| 3,596,083 | 7/1971 | Lovering | 362/32 |
| 3,638,008 | 1/1972 | Keller et al. | |
| 3,681,592 | 8/1972 | Hugelshofer | |
| 3,751,655 | 8/1973 | Codrino | 362/32 |
| 3,770,338 | 11/1973 | Helmuth | 362/32 X |
| 4,380,791 | 4/1983 | Nishizawa | 362/32 X |
| 4,383,729 | 5/1983 | Suzuki et al. | 385/115 |
| 4,480,292 | 10/1984 | Schuder | 362/251 |
| 4,509,104 | 4/1985 | Suzuki et al. | 362/264 X |
| 4,740,870 | 4/1988 | Moore et al. | 362/32 |
| 4,757,427 | 7/1988 | Oostvogels et al. | 362/32 |
| 4,789,989 | 12/1988 | Stem et al. | |
| 4,958,263 | 9/1990 | Davenport et al. | 362/32 |
| 5,217,285 | 6/1993 | Sopori | |
| 5,436,805 | 7/1995 | Hsu et al. | 362/32 |

FOREIGN PATENT DOCUMENTS

| | | |
|---|---|---|
| 0367032 | 5/1990 | European Pat. Off. |
| 2260746 | 9/1975 | France |
| 3434536 | 3/1986 | Germany |
| 1581961 | 7/1990 | U.S.S.R. ............... 362/32 |

*Primary Examiner*—Thomas M. Sember
*Attorney, Agent, or Firm*—G. S. Grunebach; M. W. Sales; W. K. Denson-Low

[57] ABSTRACT

A light source system (10) for collecting and directing light. The light source system (10) includes light cubes (12) including an enclosure (22) substantially surrounding a light emitter (26). The enclosure includes a body (22) enclosing a cavity (24). A plurality of light pipes (32) are disposed to extend through the body into the interior of the cavity, so that the light pipes (32) carry light from inside to outside the cavity. By utilizing a plurality of these light cubes (12), the intensity of light can be controlled by combining light from a plurality of such light sources into a combiner unit (16) which combines the light from all of these sources into a single path. The intensity of light in the combiner output can be controlled by selectively turning on or off one or more of the light sources. The present invention thereby provides a high intensity light source which is rugged and easy to manufacture at low cost. The modular design provides built in redundancy and light intensity control.

14 Claims, 4 Drawing Sheets

LIGHT CUBE MODULE

This is a continuation application Ser. No. 08/395,276 filed Feb. 27, 1995, now abandoned, which is a continuation application Ser. No. 08/159,417, filed Nov. 29, 1993, now abandoned.

BACKGROUND OF THE INVENTION

1. Technical Field

The present invention relates to light sources, and more particularly to a modular light source which encloses a light emitter and directs light out of the enclosure by means of light pipes.

2. Discussion

Many optical systems require a high intensity light source to be directed to specific locations separated from the light emitter. Fiber optic cables are an effective means for directing concentrated light beams to a desired location with a minimum of required space and relatively low light losses. Nevertheless, light losses in such systems are significant and a relatively high intensity lamp source is often required to generate a sufficient output.

Four primary kinds of light sources are typically used in such systems.

These include:

1. Xenon arc lamp in a transparent quartz (fused silica) envelope. In Xenon arc lamps light energy is typically collected by external conic or aspheric reflectors.

2. Xenon arc sealed in a ceramic enclosure with an internal integral reflector and transparent exit window.

3. Xenon arc lamp in a transparent quartz envelope with multiple positive lenses to image the energy from the arc into fiber optic cables.

4. Xenon arc lamp in a transparent quartz envelope with a single light pipe.

While the above kinds of lamps are generally effective for various applications, they do present a number of disadvantages. The quartz envelopes used in Nos. 1, 3 and 4 are relatively expensive to manufacture and subject to breakage. This limits their usefulness in certain applications, or necessitates expensive ruggedizing mountings which add to their size and weight. Further, the risk of breakage in quartz arc lamps poses a safety concern. Also, the external reflector required in lamp No. 1 configuration adds significantly to the cost and size; and these components must be aligned when replaced in the field. No. 2 has the disadvantages of limited collection efficiency and, in many cases, noticeable thermal instability of the arc. Lamp No. 3 is relatively difficult to align and manufacture and also does not result in an extremely efficient light source due to the high losses from the limited collection capability of the refractive lenses. Likewise, No. 4, with a single light pipe does not collect an optimum amount of energy. Also, in Nos. 1, 3 and 4 there is a safety concern due to the high intensity visible or UV radiation emanating from the clear quartz envelope. Further, Nos. 1, 2, 3, and 4 are not very efficient and provide little or no means for controlling the intensity of the light output. Also, in Nos. 1 and 2, to obtain redundancy requires a much more complex, costly, volume consuming, and less efficient configuration.

Thus it would be desirable to provide a light source that is compact and easily capable of being ruggedized while providing a highly efficient light source and generating a high level of light collection at low power levels. Further, it would be desirable to provide a light source that is easy to manufacture at low cost, easy to align and replace in the field, and which has lower weight and power requirements as compared to existing arc lamp systems. Further, it would be desirable to provide a light source which eliminates the external reflectors and which is safer than existing Xenon arc lamps.

SUMMARY OF THE INVENTION

Pursuant to the present invention a light source is provided for collecting and directing light which includes a light emitter inside an enclosure. The enclosure substantially surrounds the light emitter and includes a body enclosing a cavity. Also, a plurality of light pipes are disposed to extend through the body, each light pipe having a first end located inside the cavity and a second end extending to the exterior of the body, wherein the light pipes carry light from inside to outside the cavity.

In accordance with another embodiment of the present invention a method for controlling the intensity of light traversing a path includes the steps of providing a plurality of light modules wherein each module contains a light source and an enclosure having a cavity with the light source disposed inside the cavity. Next, light is directed from inside each cavity to one or more light pipes connected to a combiner unit. The light from each cavity is then combined into a single path using the combiner unit. Next, the light is directed out of the combiner unit into an single output light pipe and the intensity of light in the output light pipe is controlled by selectively turning on or off one or more of the light sources.

As a result, the present invention provides a high intensity light source which is rugged and easy to manufacture at low cost. Also, the modular light modules provide built in redundancy and light intensity control.

BRIEF DESCRIPTION OF THE DRAWINGS

The various advantages of the present invention will become apparent to one skilled in the art by reading the following specification and by reference to the following drawings in which.

DETAILED DESCRIPTION OF THE PREFERRED EMBODIMENTS

Figure 1:
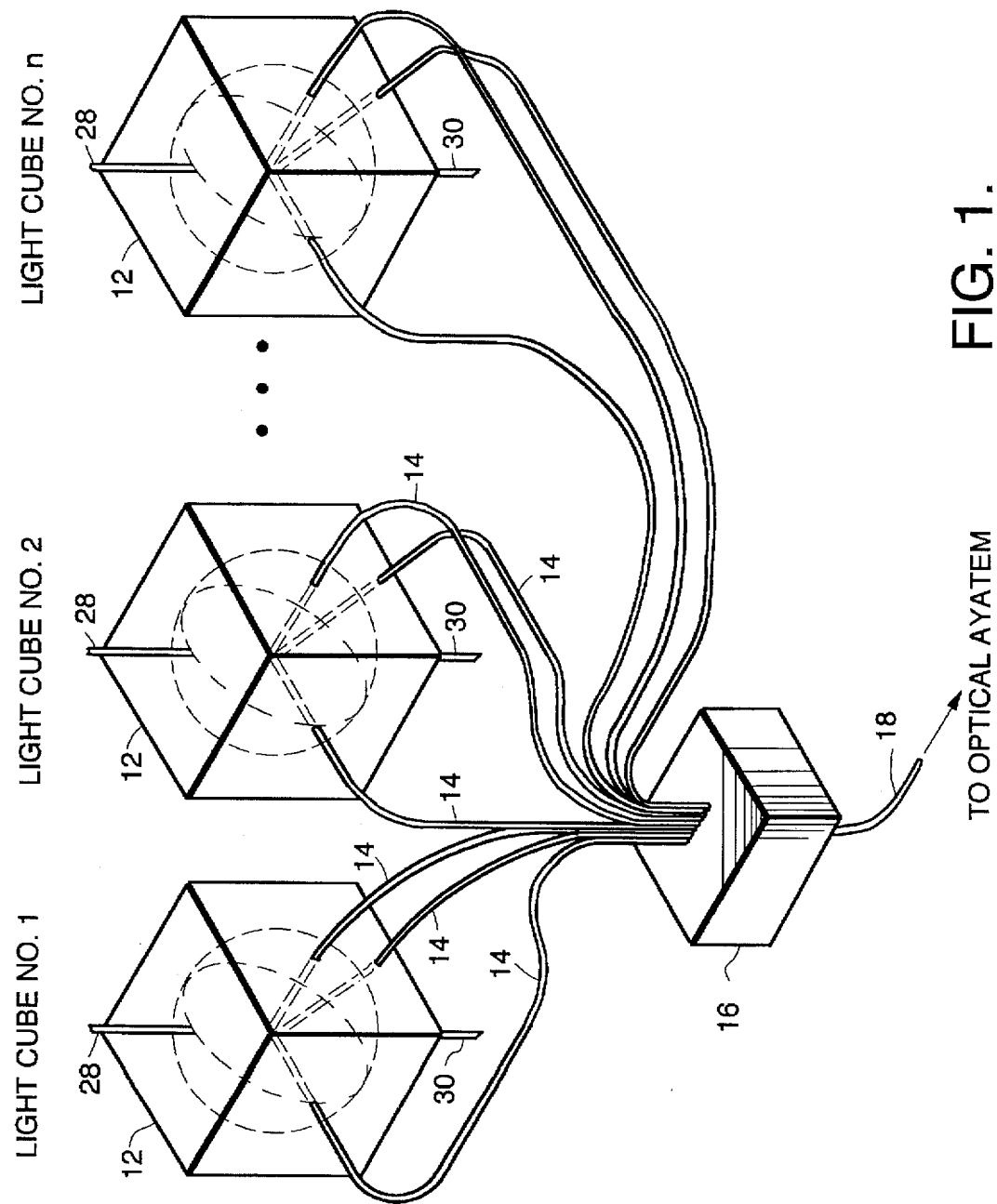
FIG. 1 is a diagram of a modular light source system in accordance with the present invention.

Referring to FIG. 1 there is shown a light source system 10 in accordance with the present invention. The light source generates a high intensity light beam which can be used in a number of applications. For example, it is useful in applications requiring the light source to be militarized or ruggedized because of its unique features as explained in more detail below. These applications include light valve projection displays (large screen and helmet mounted), airborne head down displays, solar simulation, vehicle lighting including instrument lighting, dome/door lighting and taillights, etc. In general, the light source system 10 of the present invention can be used in any application where high intensity light sources such as Xenon arc lamps or other sources are presently used.

In more detail, the light source system 10 comprises one or more light cubes 12 which produce a light output along a plurality of fiber optic cables 14. Light from the fiber optic cables are combined in a combiner/randomizer unit 16 which combines the output from all of the light cubes into a single output along a single output fiber bundle 18. It will be appreciated that "randomizing" means mixing the luminous energy and is used to smooth out any variations in brightness resulting from a particular portion of the arc's energy being accepted by a particular light pipe. This output fiber bundle 18 is then directed to the particular optical system as required. An important advantage of this system 10 is that it provides built-in redundancy. Also the light output at fiber 18 can be varied by turning one or more modules 12 on or off. One of the light cubes 20 is shown in more detail in a cross sectional view in FIG. 2. As shown in a FIG. 2, the light cube 12 includes a solid body enclosure 22 which is constructed of a ceramic or other high temperature, high strength opaque material. While the outside configuration is shown as a cube for ease of illustration, it may take other shapes such as hexagonal, octagonal etc. Inside the cube is a spherical cavity 24 inside of which a light source 26 is positioned. In the preferred embodiment, the light source is a Xenon arc driven by electrical current provided by a pair of electrodes 28 and 30. This may be AC or DC. The electrodes are disposed on opposite sides of the cube 22 and terminate near the center of the cube in the vicinity of the arc 26. In the case of the Xenon arc, the cavity 24 will be filled with Xenon gas. The electrodes 28 and 30 protrude to the exterior of the cube 22 to provide a means of making electrical contact with the electrodes.

A plurality of light pipes 32 extend through the body 22 into the interior 24 of the enclosure 20. Each light pipe 32 has in entrance end 34 which is disposed closely adjacent to the Xenon arc 26. The light pipes 32 may be made of any transparent high temperature material in the preferred embodiment they are made of fused quartz (fused silica). Also, in the preferred embodiment the light pipes 32 are solid and circular in cross-section. However, it is possible to use light pipes which are hollow with a transparent window to contain the xenon gas within the cavity, or which are non-circular in cross-section (for example square or rectangular). Also, the light pipes may have a cross-section which is not consistent over the entire length, for example they may have a cone shape or tapered cross-section. In the preferred embodiment, the entrance end 34 is flat. However, it is possible to use an entrance end which is convex or concave. In brief, the shape, composition, number and location of the light pipes can be tailored to suit the desired output for any particular application.

Figure 2:
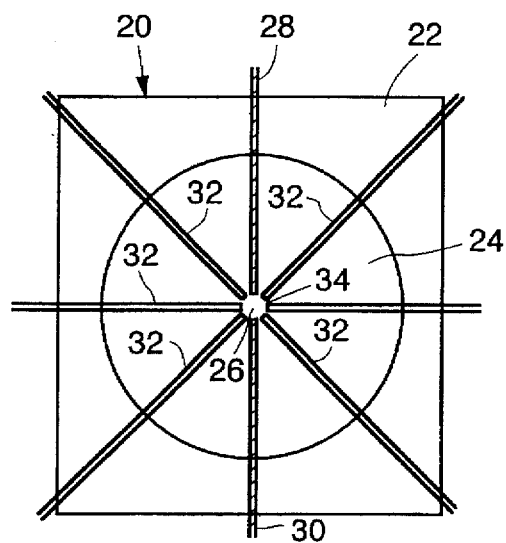
FIG. 2 is a cross sectional diagram of one embodiment of a single light cube utilizing symmetrically disposed light pipes in accordance with the present invention.
Figure 3:
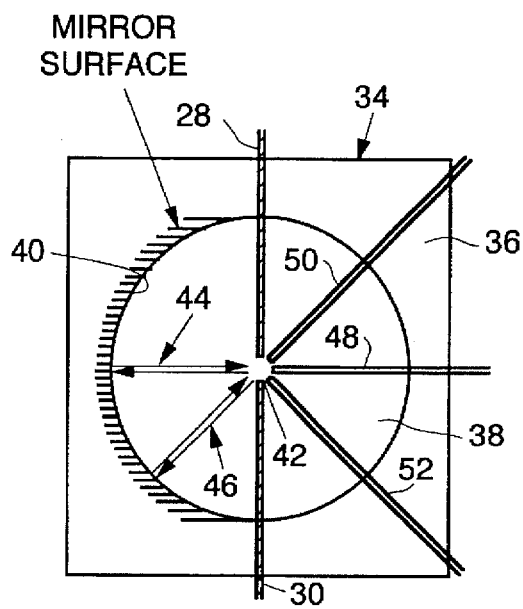
FIG. 3 is a diagram of an alternative embodiment of a light cube employing a reflective surface opposite the light pipes inside cube.

For example, referring to FIG. 3 an embodiment of light module 12 in accordance with the present invention as shown. The light module 12 includes a ceramic body 36 having a spherical cavity 38. Electrodes 28 and 30 are identical to those described above in FIG. 2. Spherical cavity 38 is coated on one hemisphere with a mirror surface 40. This mirrored surface 40 reflects light originating from the light source 42 which is similar to the light source 26 described in more detail above. The light from light source 42 radiates outward in all directions including the directions shown by the pair of arrows 44 and 46. That is, the light rays 44 represent the light emitted from the light source 42 in a direction normal to the mirror surface and tracing the same path back toward the light source. This light then enters light pipe 48. Likewise, light rays 46 represent the path of light from light source 42 incident normally upon the mirror surface 40 and reflected back along the same path into light pipe 50. Of course, light will also enter light pipes 48 and 50 directly from the light source 42 similar to the manner described above in connection with FIG. 2. Thus, it can be seen that mirror surface 40 provides a multiplying effect of the intensity of light entering light pipes 48 and 50. A similar multiplying effect will be achieved for light pipe 52 due to light reflecting from the mirror surface 40, as well as for any additional light pipes which are disposed within cavity 38 opposite the mirrored surface. Also, the light pipes themselves can have a reflective coating on their surface (exclusive of their entrance and exit faces).

Figure 4:
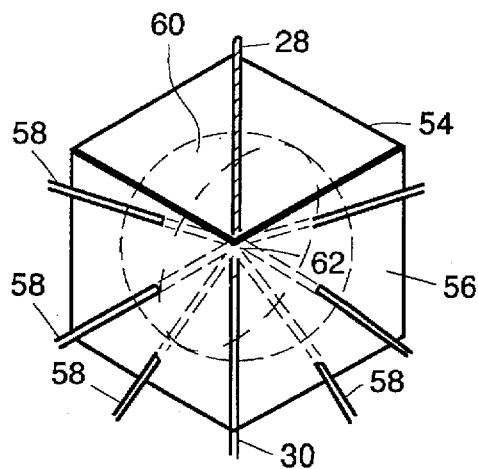
FIG. 4 in another embodiment of the present invention employing a light cube having light pipes disposed in three dimensions on the light cube.

Referring now to FIG. 4 there is shown a perspective view of another embodiment of the light module 54 which comprises a ceramic body 56, electrodes 28 and 30 as well as a plurality light pipes 58 which protrude into a cavity 60 inside of the ceramic body 56. In this embodiment, it can be seen that the light pipes 58 are disposed in the body 56 in a plurality of planes in contrast to light pipes 50 and 52 in FIG. 3 which are disposed along a single plane (the same plane as the electrodes). Also, in this embodiment, the entire surface of the cavity 60 is coated with a reflectorized mirror surface 64 to provide the light multiplication effect as described above in connection with FIG. 3. Of course, to achieve this multiplication effect, it should be noted that the light pipes should be disposed in a manner to insure that no two light pipes are collinear thus enabling light to be reflected from a light source 62 to the mirrored surface 64 and back into the light pipes 58.

While increasing the number of light pipes will result in a greater total efficiency of light output from the light module 54 there is a limitation on the number of light pipes that can be disposed into the ceramic body 56. As best seen in FIG. 2, the total number of light pipes will depend on the space available in the vicinity of the light source. Thus, the total number of light pipes available will depend on a number of factors including the proximity to the light source (which will affect the light intensity per light pipe) and the light pipe diameter. Thus, while total light output is increased by including more light pipes, increasing the number of light pipes will at some point require increasing the distance of the light pipes from the light source, which will have the countervailing effect of reducing the intensity of the light carried by each light pipe.

Figure 5:
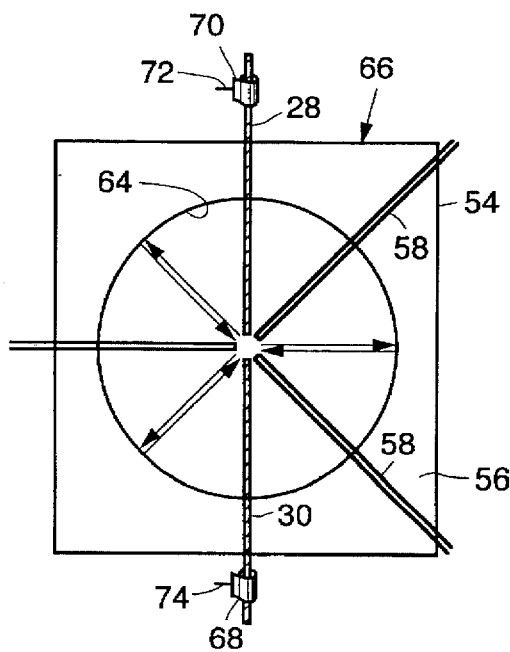
FIG. 5 is a diagram of an additional embodiment of the present invention employing a plurality of light pipes inside a reflectorized spherical cavity.

Referring now to FIG. 5, another embodiment of light source module 66 in accordance with the present invention is shown. This embodiment is essentially the same as the one shown in FIG. 4 except it is depicted in two dimensions only. In addition, however in this embodiment the electrodes 28 and 30 are adapted to be inserted into a pair of sockets 68 and 70, which are connected to a source of electrical current 80 by means of wires 72 and 74. Thus, the light source module 66 can be readily inserted into sockets 68 and 70 in a quick and efficient manner. Also, in the preferred embodiment the electrodes comprise rods of sufficient strength to hold the entire module 66 without requiring an additional mounting fixture.

It should be noted that the mirror coating 64 may comprise one of a variety of mirrored coatings such as cold mirror (which reflects visible and transmits infra-red energy), aluminum, silver, rhodium, etc. Alternatively, a diffuse coating may be used. For example, for a Xenon arc over half of the radiated energy produced by the arc is in the infra-red region. Much of this energy can be eliminated if necessary by coating the interior of the cavity with a cold mirror coating. Also, the light cube 20 can be cooled by airflow, or by convection, or by water cooling.

It should be noted that about 10% of the Xenon radiated energy is in the ultra-violet region. This energy, which is usually detrimental to many display systems, can be removed by doping the light pipes or by inserting filters. However, in some applications this energy may be desired. Also, the Xenon gas in the cavity may be doped to provide enhanced output in a particular spectral region.

Also, the cavity 60 may not be the optimum shape for some applications and another shape could be used. In fact, in some cases the shape of the cavity is independent of performance and does not enter into the operation of the module functionally other than to contain the fill gas (e.g. Xenon). Filters can be incorporated to remove ultraviolet and/or infrared energy.

Figure 7:
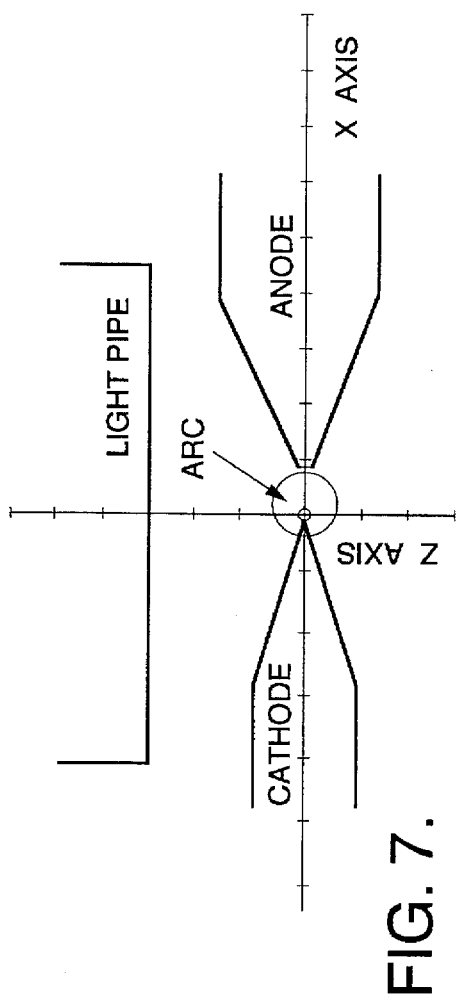
FIG. 7 is a diagram of one of the light pipes in the vicinity of the electrodes.
Figure 6:
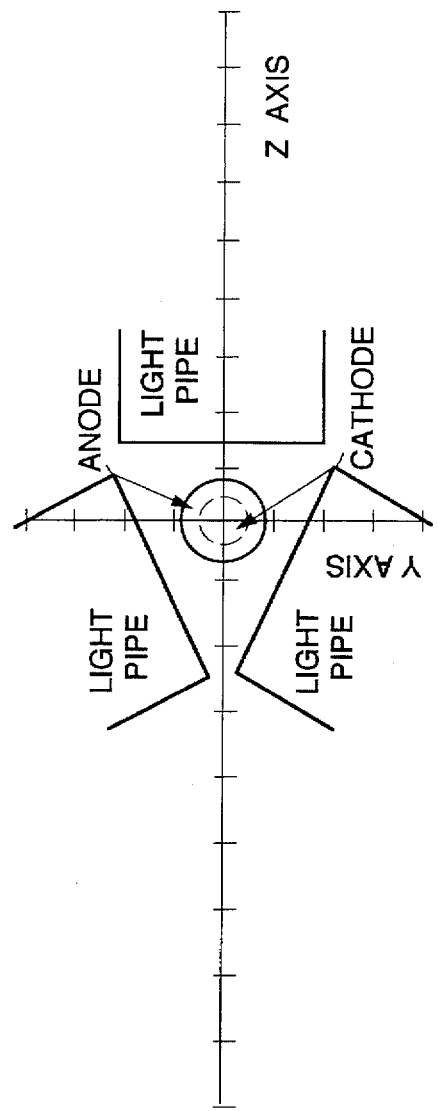
FIG. 6 is a diagram of one specific configuration which is independent of cavity shape in which three square light pipes are utilized in a triad arrangement.
Figure 8A:
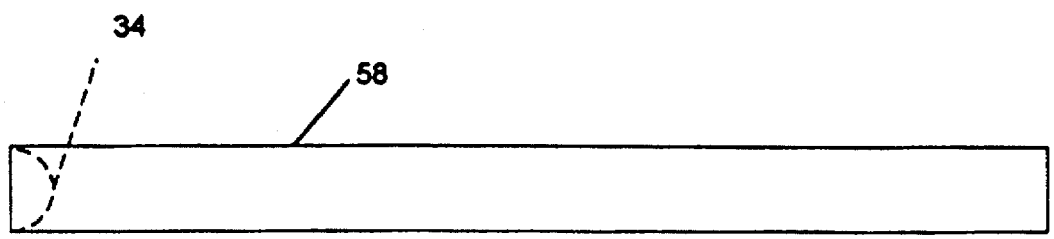
FIGS. 8A and 8B are diagrams illustrating light pipes with curved edges.
Figure 8B:
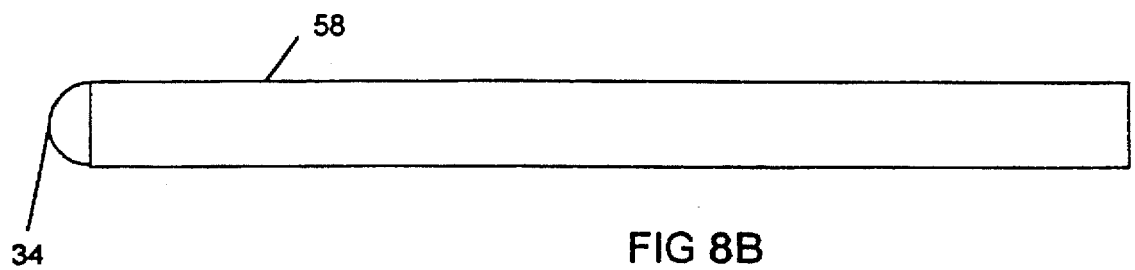

FIG. 6 illustrates a triad pipe (using square light pipes) arrangement which is independent of cavity shape. FIG. 7 shows an alternate view of the relationship of one of the pipes to the electrodes. FIGS. 6 and 7 show the light pipe positions in close proximity to the electrodes. It should be appreciated that in some applications a specific fill gas beside Xenon can be utilized to tailor the light output spectrally and quantitatively.

From the foregoing it can be seen that the present invention provides a light source which can easily be made to be extremely rugged because it eliminates the conventional glass envelope of Xenon arc lamps and also avoids the use of external reflectors. Further, the light source of the present inventions can be constructed at reasonable cost and can be easily adapted to a wide variety of light intensity and spectral requirements. Also, the present invention provides a highly efficient light source which generates a relatively high level of light collection at low power levels. Also, the present invention is easy to align and replace in the field and has lower weight and power requirements as compared to existing arc lamp systems.

Those skilled in the art can appreciate that other advantages can be obtained from the use of this invention and that modifications may be made without departing from the true spirit of the invention after studying the specification, drawing and following claims.

What is claimed:

1. An apparatus for collecting and directing light comprising:
    a high intensity light source;
    an enclosure substantially surrounding said high intensity light source, said enclosure including a sealed solid, high strength opaque body, said body operable at high temperatures enclosing a spherical cavity forming a housing, the high intensity light source being exposed inside the spherical cavity; and
    a plurality of light pipes disposed to extend through said solid, high strength opaque body each having a first end located inside the spherical cavity proximate the exposed high intensity light source and a second end extending to an exterior of said body, the light pipes carrying light from inside to outside the cavity, wherein the exposed high intensity light source comprises an electrically powered plasma device, and the apparatus further includes positive and negative electrodes extending through the body into the cavity, said cavity containing a gas which produces plasma between the two electrodes when energized, and wherein said first ends project inside the cavity in close proximity to the plasma, wherein said gas, electrodes and light pipes are all integral within said cavity and said light pipes extend into said gas.

2. The apparatus of claim 1, wherein the light source is a xenon arc lamp.

3. The apparatus of claim 1, wherein said exterior of said body is a multi-sided polyhedron.

4. The apparatus of claim 1, wherein said light pipes are composed of fused quartz.

5. The apparatus of claim 1, wherein said light pipes have an entrance surface which is flat.

6. The apparatus of claim 1, wherein said light pipes have an entrance surface which is curved.

7. The apparatus of claim 1, wherein said electrodes extend outside of said enclosure and said apparatus further comprises a socket means to permit plugging and unplugging of the electrodes to a source of electrical current.

8. The apparatus of claim 1, wherein the light pipes extend into the interior of the cavity from a plurality of directions to within close proximity of said light source.

9. The apparatus of claim 8 wherein said light pipes lie on a plurality of planes.

10. The apparatus of claim 1 wherein the light pipes are rectangular in cross-section.

11. An apparatus for collecting and directing light comprising:
    a high intensity light source;
    an enclosure substantially surrounding said high intensity light source, said enclosure including a sealed solid, high strength opaque body, said body operable at high temperatures enclosing a spherical cavity forming a housing, the high intensity light source being exposed inside the spherical cavity; and
    a plurality of light pipes disposed to extend through said solid, high strength opaque body each having a first end located inside the spherical cavity proximate the exposed high intensity light source and a second end extending to an exterior of said body, the light pipes carrying light from inside to outside the cavity, wherein the exposed high intensity light source comprises an electrically powered plasma device, and the apparatus further includes positive and negative electrodes extending through the body into the cavity, said cavity containing a gas which produces plasma between the two electrodes when energized, and wherein said first ends project inside the cavity in close proximity to the plasma, wherein an internal surface of the cavity substantially reflects the light produced by said light source.

12. An apparatus for collecting and directing light comprising:
    a high intensity light source;
    an enclosure substantially surrounding said high intensity light source, said enclosure including a sealed solid, high strength opaque body, said body operable at high temperatures enclosing a spherical cavity forming a housing, the high intensity light source being exposed inside the spherical cavity; and
    a plurality of light pipes disposed to extend through said solid, high strength opaque body each having a first end located inside the spherical cavity proximate the exposed high intensity light source and a second end extending to an exterior of said body, the light pipes carrying light from inside to outside the cavity, wherein the exposed high intensity light source comprises an electrically powered plasma device, and the apparatus further includes positive and negative electrodes extending through the body into the cavity, said cavity containing a gas which produces plasma between the two electrodes when energized, and wherein said first ends project inside the cavity in close proximity to the plasma, wherein the spherical cavity surface is coated with a material which reflects visible light and transmits infrared light.

13. An apparatus for collecting and directing light comprising:

a high intensity light source;

an enclosure substantially surrounding said high intensity light source, said enclosure including a sealed solid, high strength opaque body, said body operable at high temperatures enclosing a spherical cavity forming a housing, the high intensity light source being exposed inside the spherical cavity; and a plurality of light pipes disposed to extend through said solid, high strength opaque body each having a first end located inside the spherical cavity proximate the exposed high intensity light source and a second end extending to an exterior of said body, the light pipes carrying light from inside to outside the cavity, wherein the exposed high intensity light source comprises an electrically powered plasma device, and the apparatus further includes positive and negative electrodes extending through the body into the cavity, said cavity containing a gas which produces plasma between the two electrodes when energized, and wherein said first ends project inside the cavity in close proximity to the plasma wherein said cavity is coated with a reflective coating on a side opposite said light pipes and wherein incident light which is normal to said reflective surface will be reflected into said light pipes.

14. An apparatus for collecting and directing light comprising:

a plurality of light modules, each module including an exposed high intensity source of light;

an enclosure at least partially surrounding said exposed high intensity light source, said enclosure including a sealed high strength opaque body operable in high temperatures enclosing a spherical cavity, said high intensity light source being inside said cavity, a plurality of light pipes each disposed to extend through said body having a first end located inside the cavity proximate said exposed high intensity light source and a second end extending outside the body, the light pipes carrying light from inside the cavity to outside the cavity, wherein the light source comprises an electrically powered plasma device, and the apparatus further includes positive and negative electrodes extending through the body into the cavity, said cavity containing a gas which produces plasma between the two electrodes when energized, wherein said first end projects inside the cavity in close proximity to the plasma, wherein said gas, electrodes and light pipes are all integral within said cavity and said light pipes extend into said gas;

a combiner and randomizer means for receiving the second ends of each of the light pipes and for mixing and directing the light from each light pipes into an output port; and a light pipe coupled to said output port for receiving light originating from each of the light sources.

* * * * *